(12) United States Patent
Ramprasad et al.

(10) Patent No.: US 9,143,887 B2
(45) Date of Patent: Sep. 22, 2015

(54) WIRELESS DEVICE CONFIGURED TO OPERATE UNDER A PLURALITY OF DIFFERENT BRANDS AND A PLURALITY OF DIFFERENT NETWORKS AND CONFIGURED TO BE CUSTOMIZED TO ONE BRAND AND ONE NETWORK

(71) Applicant: Tracfone Wireless, Inc., Miami, FL (US)

(72) Inventors: Satish Ramprasad, Miramar, FL (US); Sergio Rivera, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 14/057,570

(22) Filed: Oct. 18, 2013

(65) Prior Publication Data

US 2014/0113610 A1   Apr. 24, 2014

Related U.S. Application Data

(60) Provisional application No. 61/715,680, filed on Oct. 18, 2012.

(51) Int. Cl.
*H04W 4/00* (2009.01)
*G06Q 10/10* (2012.01)
*H04L 12/24* (2006.01)
*H04W 88/06* (2009.01)
*H04W 8/26* (2009.01)

(52) U.S. Cl.
CPC ............. *H04W 4/001* (2013.01); *G06Q 10/10* (2013.01); *H04L 41/0806* (2013.01); *H04W 8/265* (2013.01); *H04W 88/06* (2013.01)

(58) Field of Classification Search
USPC .............................. 455/414.1, 418, 558, 566
See application file for complete search history.

(56) References Cited

U.S. PATENT DOCUMENTS

2014/0025735 A1 *   1/2014   Garcia-Martinez et al. ... 709/204

* cited by examiner

*Primary Examiner* — Sam Bhattacharya
(74) *Attorney, Agent, or Firm* — Baker & Hostetler LLP

(57) ABSTRACT

A process of configuring an electronic device and an electronic device configured to operate under a plurality of different brands and with a plurality different networks. The brand and network to be utilized are designated at the point-of-sale, during activation, by the seller, and/or by the user. The electronic device including a processor configured to execute instructions and a display device configured to generate an interface based in part in response to the processor. The electronic device further including a memory configured to store the instructions to operate the electronic device. The processor further configured to execute a component to designate a brand and network to be utilized at the point-of-sale, during activation, by the seller, and/or by the user.

22 Claims, 4 Drawing Sheets

WIRELESS DEVICE CONFIGURED TO OPERATE UNDER A PLURALITY OF DIFFERENT BRANDS AND A PLURALITY OF DIFFERENT NETWORKS AND CONFIGURED TO BE CUSTOMIZED TO ONE BRAND AND ONE NETWORK

CROSS-REFERENCE TO RELATED APPLICATIONS

This application claims the benefit from U.S. Provisional Application No. 61/715,680 filed on Oct. 18, 2012, which is hereby incorporated by reference in its entirety for all purposes as if fully set forth herein.

BACKGROUND OF THE DISCLOSURE

1. Field of the Disclosure

This disclosure relates generally to a wireless device that is configured to operate under a plurality of different brands and with a plurality different networks. More particularly, the disclosure relates generally to a wireless device that is configured to operate under a plurality of different brands and with a plurality different networks, the brand and network to be utilized being designated at the point-of-sale, during activation, by the seller, and/or by the user.

2. Related Art

Generally, most wireless devices are sold to users having a configuration to operate as a particular brand and/or on a particular wireless network or wireless virtual network. The configurations can include various software components, system settings, network settings, network and/or operator applications, brand customization features and the like. For example, it is common practice to customize and apply different settings to the same wireless phone (i.e. same manufacturer and model) by the service provider. Phones will be either loaded with software to make such phones both compatible with the network of a specific brand but also, due to the subsidy applied to the cost of phones, to make such phones incompatible with the networks of others, including brands owned by the same entity.

This approach requires a wireless device seller to manage an inventory of phones for each type of configuration. In other words, a single type of wireless device will typically have to be configured by the manufacturer for each brand, each network operator or mobile virtual network operator. This results in a much greater inventory of wireless devices. In addition to the greater inventory, this also requires a wireless device seller to be able to anticipate the demands for a particular phone configured for a particular brand, mobile network operator or mobile virtual network operator. Additionally, users of phones will be required to purchase the same phone (again at a cost to the service provider due to the subsidy) to make it work with another brand even with the same service provider.

Accordingly, there is a need for a wireless device to enable a wireless device seller and/or wireless device purchaser to be able to purchase a single wireless device that may be customized to operate under a desired brand, on a desired mobile network and/or virtual mobile network.

SUMMARY OF THE INVENTION

The foregoing needs are met, to a great extent, by the invention, with a wireless device configured to be customized and configured for a particular brand and/or for a particular wireless network at the point-of-sale, during activation, by the seller and/or by the purchaser. In particular, the invention is intended to solve the challenges of inventory management of identical phones that are customized for various incompatible brands.

In one aspect, a wireless device is configured to operate under a plurality of different brands and with a plurality different networks, a brand and a network to be utilized being designated one of at a point-of-sale, during activation, by a seller, and by a user, the electronic device includes a processor configured to execute instructions, a display device configured to generate an interface based in part in response to the processor, a memory configured to store the instructions to operate the electronic device, and the processor further configured to execute a customization component to designate the brand and the network to be utilized one of at the point-of-sale, during activation, by the seller, and by the user, wherein designating the brand and the network comprises at least one of designating setting configurations, software components, system settings, network settings, network operator applications, and brand customization features.

In another aspect, a process to configure a wireless device under a plurality of different brands and with a plurality different networks, a brand and a network to be utilized being designated one of at a point-of-sale, during activation, by a seller, and by a user, includes executing instructions in a processor, generating an interface on a display based in part in response to the instructions, storing the instructions to operate the wireless device in a memory, and executing a customization component to designate the brand and the network to be utilized one of at the point-of-sale, during activation, by the seller, and by the user, designating the brand and the network comprising at least one of designating setting configurations, software components, system settings, network settings, network operator applications, and brand customization features.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Reference in this specification to an electronic device is intended to encompass devices such as wireless devices, mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Wireless devices may connect to a "wireless network" or "network" and are intended to encompass any type of wireless network to obtain mobile phone services through the use of a wireless device, such as the Global System for Mobile Communication (GSM) network, Code-Division Multiple Access (CDMA) network or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Customization Component and Customization Process

Figure 1:
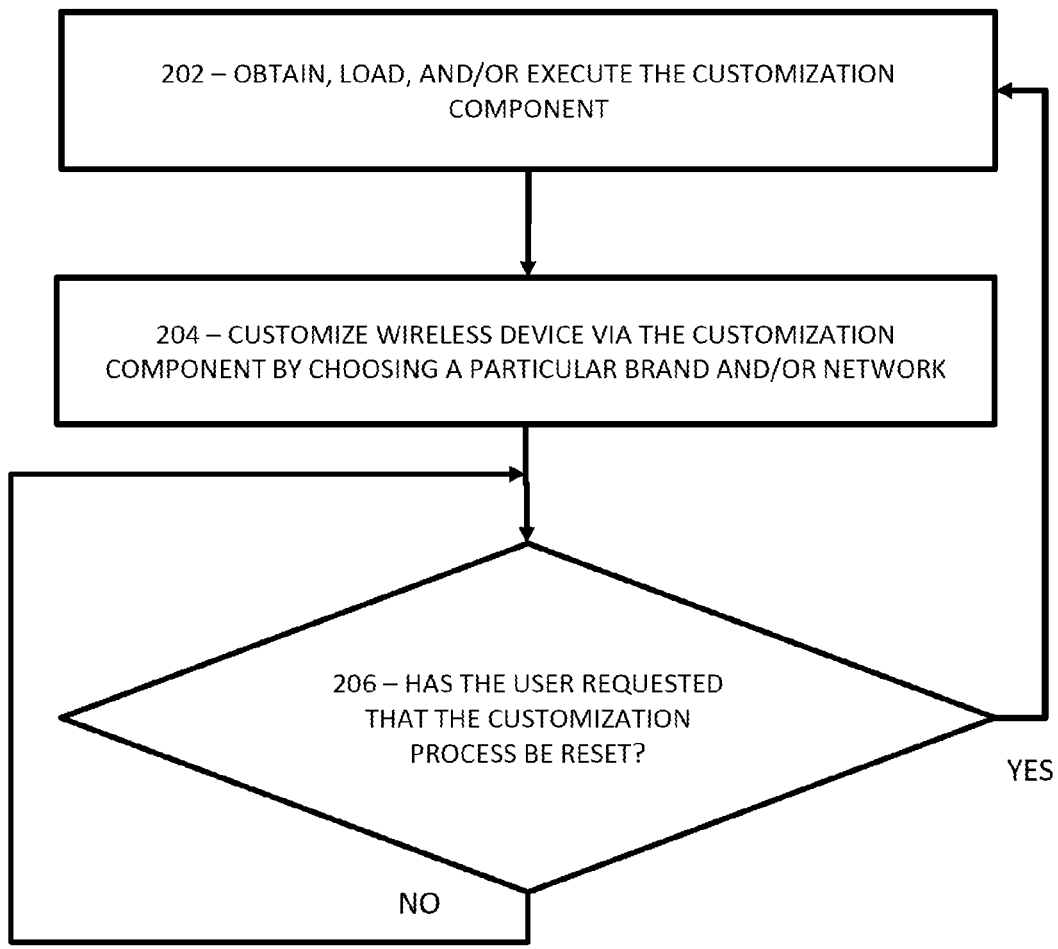
FIG. 1 shows a process of customizing the wireless device in accordance with aspects of the invention.

FIG. 1 shows a process of customizing the wireless device in accordance with aspects of the invention. In particular, the customization process allows a wireless device to be configured to operate under a plurality of different brands and/or operate with a plurality of different networks. The customization process is associated with a customization component 100 that may be stored on a wireless device, such as the electronic device 104, described with respect to FIG. 3. The customization process and component may be implemented a number of different ways. Turning to FIG. 1, process step 202 starts the customization process by obtaining, loading, and/or executing the customization component. For example, the customization component may (1) include a software application or the like and the software and settings may reside on the wireless device; (2) the software or settings may be delivered wirelessly to the wireless device; (3) the software may be loaded on the SIM card, and/or (4) the application may be obtained and/or purchased from an application store (e.g., Google Play, iTunes, or the like).

Next in process step 204, the user may be given a choice of a brand and/or a network in which to associate the wireless device. The choice may be a menu of available brands, available networks, and/or the like. Alternatively, executing a particular application may be the manner in which the user makes the choice of a particular brand and/or network.

The customization process will allow the user to either select the brand/network or make the phone compatible with a purchased airtime card or product activation code. Another benefit to the network and brand customization is that the customization process can be tailored with specific applications and restrictions (e.g., kid friendly applications and restrictions).

It may further be possible to reset the device to allow the user to select different services as desired. In particular, as shown in step 206, the customization component may include a resetting step. Thereafter, the processor can return to step 202 to allow the user to customize the wireless device. Ultimately, such a customization can allow for ease in controlling applications, experiences, safety, and controls.

Figure 2:
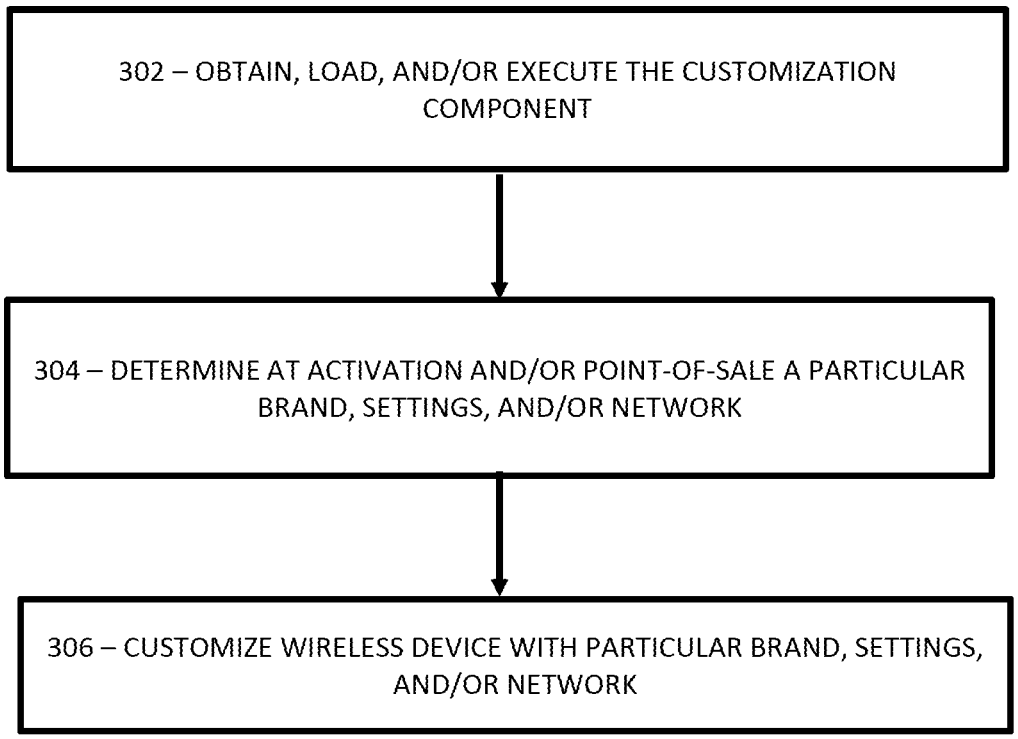
FIG. 2 shows a process of customizing the wireless device in accordance with another aspect of the invention.

FIG. 2 shows a process of customizing the wireless device in accordance with another aspect of the invention. In this alternative approach, the customization component may be preloaded or loaded, as described above, to have retail specific applications and/or settings as shown in step 302 of FIG. 2 for a number of different retailers. For example, wireless devices sold at a number of large retailers can have applications or settings as requested by each retailer in a single customization component. Accordingly, because the customization component contains all of the applications and/or settings for a plurality of retailers, the need to establish difficult inventory management is reduced.

As shown in step 304, during activation, the customization component can be set to customize the wireless device based on the activation thereof. For example, if a wireless device is purchased at a first retail establishment, the phone can be tagged through the point-of-purchase activation to load the wireless device to the specification of the first retailer, which may increase traffic to such first retailer for purpose of purchasing airtime cards or accessories. On the other hand, if the same wireless device is purchased from a second retail establishment, the same wireless device through the point-of-purchase activation may load the wireless device to the specifications of the second retailer.

The five main use cases that this would help solve are:

Having one device that covers multiple networks (e.g., T-Mobile, AT&T), and a subscription code that is obtained from one of many parameters, one of which being the activation information, POS information, and the like that determines which network configuration the device uses.

For devices maintaining billing/customer charging information, a product selection code sent out, which covers which billing platform, or mechanism that the device uses.

Brand customization, wherein devices can be branded differently, for the same billing method (For example, differentiate a Net10 device sold by a retailer vs. a StraightTalk device sold at the same retailer).

Brand customization, wherein devices can be branded the same, but to different retailers, in a sense providing customization/localization to each retailer.

Other market segmentation such as a kid phone, elderly phone, or the like depending on demographics of customers activating the device.

Figure 3:
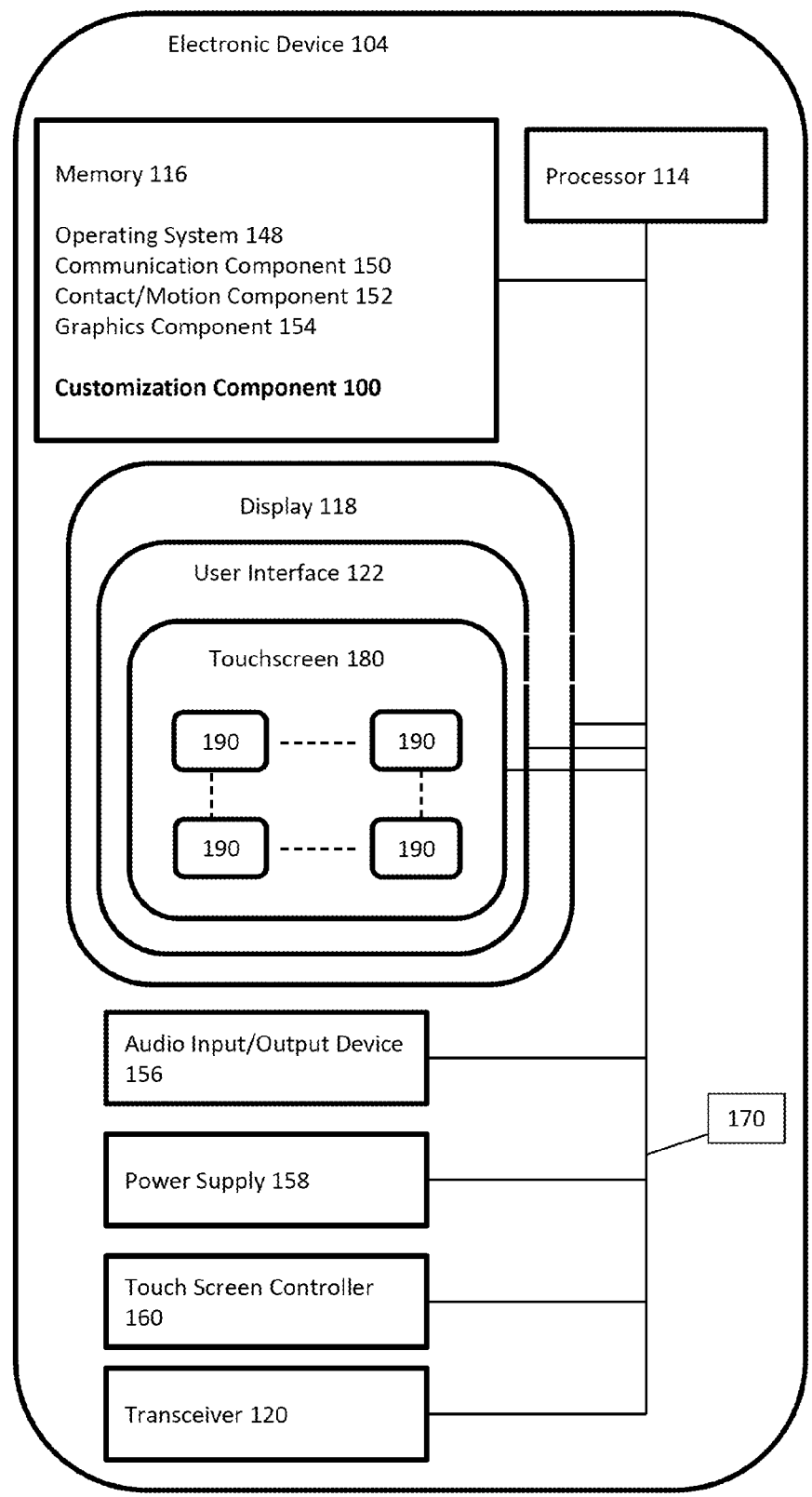
FIG. 3 shows the details of an exemplary wireless device utilizing a customization component in accordance with aspects of the invention.

FIG. 3 shows the details of an exemplary electronic device in accordance with aspects of the invention. The electronic device 104 includes a processor 114, memory 116, display 118, user interface 122, and the like. The processor 114 may be a central processing unit configured to execute instructions including instructions related to software programs. The display 118 may be a liquid crystal display having a backlight to illuminate the various color liquid crystals to provide a colorful display. The user interface 122 may be any type of physical input having buttons and further may be implemented as a touchscreen 180.

The electronic device 104 may further include in the memory 116, an operating system 148, a communication component 150, a contact/motion component 152, a graphics component 154 and the like. The operating system 148 together with the various components providing software functionality for each of the components of the electronic device 104.

Additionally, in one aspect of the invention, the memory 116 may store the customization component 100. As described below, the customization component 100 may also be stored in other locations of the electronic device 104 and/or locations remote from the electronic device 104. For example, the customization component may (1) include a software application or the like and the software and settings may reside on the wireless device; (2) the software or settings may be delivered wirelessly to the wireless device; (3) the software may be loaded on the SIM card, and/or (4) the application may be obtained and/or purchased from an application store (e.g., Google Play, iTunes, or the like).

The memory 116 may include a high-speed random-access memory. Also, the memory 116 may be a non-volatile memory, such as magnetic fixed disk storage, flash memory or the like. These various components may be connected through various communication lines including a data bus 170.

Additionally, the electronic device 104 may include an audio input/output device 156. The audio input/output device 156 may include speakers, speaker outputs, and the like, providing sound output; and may include microphones, microphone inputs, and the like, for receiving sound inputs. The audio input/output device 156 may include and analog to digital converter and a digital to audio converter for audio input and output functions respectively.

When implemented as a wireless device, the electronic device 104 may include a transceiver 120 and the like. The electronic device 104 may provide radio and signal processing as needed to access a network for services. The processor 114 may be configured to process call functions, data transfer, and the like and provide other services to the user.

The touchscreen 180 of the invention may be implemented in the display 118 and may detect a presence and location of a touch of a user within the display area. For example, touching the display 118 of the electronic device 104 with a finger or hand. The Touchscreen 180 may also sense other passive objects, such as a stylus.

In operation, the display 118 may display various objects 190 associated with applications for execution by the processor 114. In this regard, a user may touch the display 118, and in particular the touchscreen 180, to interact with the objects 190. For example touching an object 190 may execute an application in the processor 114 associated with the object 190 that is stored in memory 116. Additionally or alternatively, touching an object 190 may open a menu of options to be selected by the user. The display 118 may include a plurality of the objects 190 for the user to interact with. Moreover the display 118 may include a plurality of screens. The display 118 showing one screen at a time. The user may interact with the display 118 to move a screen into view on the display 118. Various objects 190 may be located in the each of the screens.

One of the objects 190 may be the customization component 100. In this regard, selecting the object 190 implementing customization component 100 may implement the process associated with FIG. 1 or the process associated with FIG. 2. Selecting the object 190 implementing customization component 100 again may reset the customization process as shown in step 206 as shown in FIG. 1.

Figure 4:
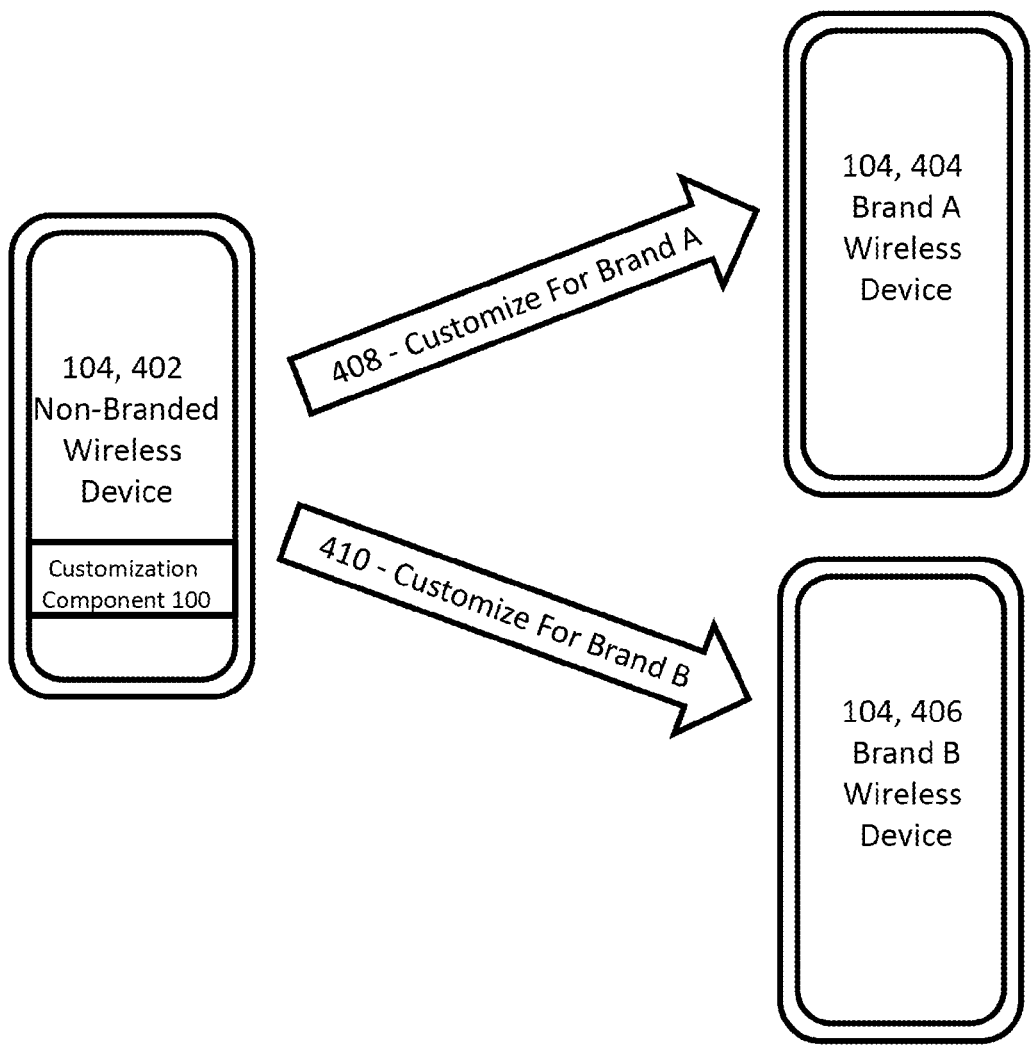
FIG. 4 illustrates an exemplary wireless device utilizing a customization component to become customized for a particular brand in accordance with aspects of the invention.

FIG. 4 illustrates an exemplary wireless device utilizing a customization component to become customized for a particular brand in accordance with aspects of the invention. More specifically, wireless device 104 may initially be a non-branded wireless device 402 and include the customization component 100 described above. Consistent with process step 204 described with respect to FIG. 1 or process step 306 described with respect to FIG. 2, the non-branded wireless device 402 may be customized for Brand A as shown by arrow 408; or the non-branded wireless device 402 may be customized for Brand B as shown by arrow 410. Accordingly, the resulting wireless device 104 may be customized to a Brand A wireless device 404 as shown in FIG. 4; or the resulting wireless device 104 may be customized to a Brand B wireless device 406 as shown in FIG. 4.

Accordingly, the system and process described above relates generally to a wireless device that is configured to operate under a plurality of different brands and with a plurality different networks, the brand and network to be utilized being designated at the point-of-sale, during activation, by the seller, and/or by the user. The result is that a user has a more positive experience with the wireless device. Moreover, inventory issues are reduced greatly.

For the purposes of this disclosure a computer readable medium stores computer data, which data can include computer program code that is executable by a processor of the SIM or mobile device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, and/or the like, and/or a combination of two or more thereof.

In an embodiment, the invention may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the invention, the methods described herein are intended for operation with dedicated hardware implementations including, but not limited to, microprocessors, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless device configured to operate under a plurality of different brands and with a plurality different networks, a brand and a network to be utilized being designated one of at a point-of-sale, during activation, by a seller, and by a user, the wireless device comprising:
a processor configured to execute instructions;
a display device configured to generate an interface based in part in response to the processor:
a memory configured to store the instructions to operate the electronic device; and
the processor further configured to execute a customization component to designate the brand and the network to be utilized one of at the point-of-sale, during activation, by the seller, and by the user,
wherein designating the brand and the network comprises at least one of designating setting configurations, software components, system settings, network settings, network operator applications, and brand customization features.

2. The wireless device according to claim 1 wherein the setting configurations, the software components, the system settings, the network settings, the network operator applications, and the brand customization features are stored in the memory.

3. The wireless device according to claim 1 wherein the processor is further configured to have the brand and the network designation reset and thereafter the processor further configured to execute the customization component to designate a brand and network to be utilized.

4. The wireless device according to claim 1 wherein the processor is further configured to designate one of a plurality of brands.

5. The wireless device according to claim 1 wherein the processor is further configured to designate one of a plurality of networks.

6. The wireless device according to claim 1 wherein the processor is further configured to wirelessly receive the setting configurations, the software components, the system settings, the network settings, the network operator applications, and the brand customization features.

7. The wireless device according to claim 1 wherein the memory comprises a SIM card and the SIM card stores the setting configurations, the software components, the system settings, the network settings, the network operator applications, and the brand customization features.

8. The wireless device according to claim 1 wherein the processor is configured to receive the setting configurations, the software components, the system settings, the network settings, the network operator applications, and the brand customization features from an application store.

9. A process to configure an wireless device under a plurality of different brands and with a plurality, different networks, a brand and a network to be utilized being designated one of at a point-of-sale, during activation, by a seller, and by a user, the process comprising:
executing instructions in a processor;
generating an interface on a display based in part in response to the instructions;
storing the instructions to operate the wireless device in a memory; aR4
executing a customization component to designate the brand and the network to be utilized one of at the point-of-sale, during activation, by the seller, and by the user; and
designating the brand and the network comprising at least one of designating setting configurations, software components, system settings, network settings, network operator applications, and brand customization features.

10. The process according to claim 9 further comprising storing the setting configurations, the software components, the system settings, the network settings, the network operator applications, and the brand customization features in the memory.

11. The process according to claim 9 further comprising resetting the brand and the network designation and thereafter executing the customization component to designate a brand and network to be utilized.

12. The process according to claim 9 wherein the executing a customization component comprises instructions to designate one of a plurality of brands.

13. The process according to claim 9 wherein the executing a customization component comprises instructions to designate one of a plurality of networks.

14. The process according to claim 9 further comprising receiving wirelessly the setting configurations, the software components, the system settings, the network settings, the network operator applications, and the brand customization features.

15. The process according to claim 9 wherein the memory comprises a SIM card and the SIM card stores the setting configurations, the software components, the system settings, the network settings, the network operator applications, and the brand customization features.

16. The process according to claim 9 further comprising receiving the setting configurations, the software components, the system settings, the network settings, the network operator applications, and the brand customization features from an application store.

17. A non-transitory tangible storage medium executable on a processor of a wireless device to configure the wireless device under a plurality of different brands and with a plurality different networks, a brand and a network to be utilized being designated one of at a point-of-sale, during activation, by a seller, and by a user, the process comprising:

instructions for generating an interface on a display based in part in response to the instructions;

instructions for storing the instructions to operate the wireless device in a memory;

instructions for executing a customization component to designate the brand and the network to be utilized one of at the point-of-sale, during activation, by the seller, and by the user; and instructions for designating the brand and the network comprising at least one of designating setting configurations, software components, system settings, network settings, network operator applications, and brand customization features.

18. The storage medium according to claim 17 further comprising instructions for storing the setting configurations, the software components, the system settings, the network settings, the network operator applications, and the brand customization features in the memory.

19. The storage medium according to claim 17 further comprising instructions for resetting the brand and the network designation and instructions for thereafter executing the customization component to designate a brand and network to be utilized.

20. The storage medium according to claim 17 wherein the instructions for executing a customization component comprises instructions to designate one of a plurality of brands.

21. The storage medium according to claim 17 wherein the instructions for executing a customization component comprises instructions to designate one of a plurality of networks.

22. The storage medium according to claim 17 further comprising instructions for receiving wirelessly the setting configurations, the software components, the system settings, the network settings, the network operator applications, and the brand customization features.

* * * * *